United States Patent [19]
Edlinger

[11] Patent Number: 6,039,787
[45] Date of Patent: Mar. 21, 2000

[54] PROCESS FOR RECLAIMING COMBUSTION RESIDUES

[75] Inventor: Alfred Edlinger, Baden, Switzerland

[73] Assignee: "Holderbahk" Financiere Glarus AG, Glarus, Switzerland

[21] Appl. No.: 09/068,731

[22] PCT Filed: Sep. 12, 1997

[86] PCT No.: PCT/AT97/00201

§ 371 Date: May 15, 1998

§ 102(e) Date: May 15, 1998

[87] PCT Pub. No.: WO98/12359

PCT Pub. Date: Mar. 26, 1998

[30] Foreign Application Priority Data

Sep. 17, 1996 [AT] Austria ................................ 549/96 U

[51] Int. Cl.[7] .............................. C21C 5/30; C21C 5/32; C21C 5/34
[52] U.S. Cl. ................... 75/531; 75/500; 75/501
[58] Field of Search .............. 75/501, 502, 500, 75/754, 531

[56] References Cited

U.S. PATENT DOCUMENTS

| | | | |
|---|---|---|---|
| 3,630,267 | 12/1971 | Hlinka et al. | 164/82 |
| 4,105,439 | 8/1978 | Barnes | 75/540 |
| 4,561,637 | 12/1985 | Schleimer | 75/549 |
| 4,891,064 | 1/1990 | Umezawa et al. | 75/532 |
| 5,078,785 | 1/1992 | Ibaraki et al. | 75/386 |
| 5,364,441 | 11/1994 | Worner | 75/10.1 |
| 5,366,538 | 11/1994 | Berger et al. | 75/549 |
| 5,423,900 | 6/1995 | Klintworth et al. | 75/414 |
| 5,535,234 | 7/1996 | Bullman | 373/8 |

FOREIGN PATENT DOCUMENTS

| | | |
|---|---|---|
| 484 882 | 12/1975 | Australia . |
| 769 260 | 11/1971 | Belgium . |
| 096 212 | 12/1983 | European Pat. Off. . |
| 418627 | 3/1991 | European Pat. Off. . |
| 579 591 | 1/1994 | European Pat. Off. . |
| 44 29 653 | 2/1996 | Germany . |
| 91/02824 | 3/1991 | WIPO . |

OTHER PUBLICATIONS

Patent Abstracts of Japan, vol. 95, No. 2, Mar. 31, 1995 & JP,A,06–330114.

Patent Abstracts of Japan, Sektion C, Band 7, No. 118, May 21, 1983, The Patent Office Japanese Government, Seite 151 C 167, Nr. 58–39717 (Kawasaki).

Patent Abstracts of Japan, Sektion C, Band 7, No. 118, May 21, 1983, The Patent Office Japanese Government, Seite 151 C 167, Nr 02–43312.

*Primary Examiner*—Prince Willis, Jr.
*Assistant Examiner*—Tima McGuthry-Banks
*Attorney, Agent, or Firm*—Pillsbury Madison & Sutro, LLP

[57] ABSTRACT

In a process for working up combustion residues and slags from waste incineration plants or steel works slags, the slag is charged at a slag layer height of above 1.2 m into a converter (1), in which the molten slag is reacted with a metal bath (4) through which oxygen is blown. The oxygen is introduced into the bath (4) for cooling the submerged tuyeres (7, 8) in the form of air or along with $CO_2$ or water vapor.

10 Claims, 1 Drawing Sheet

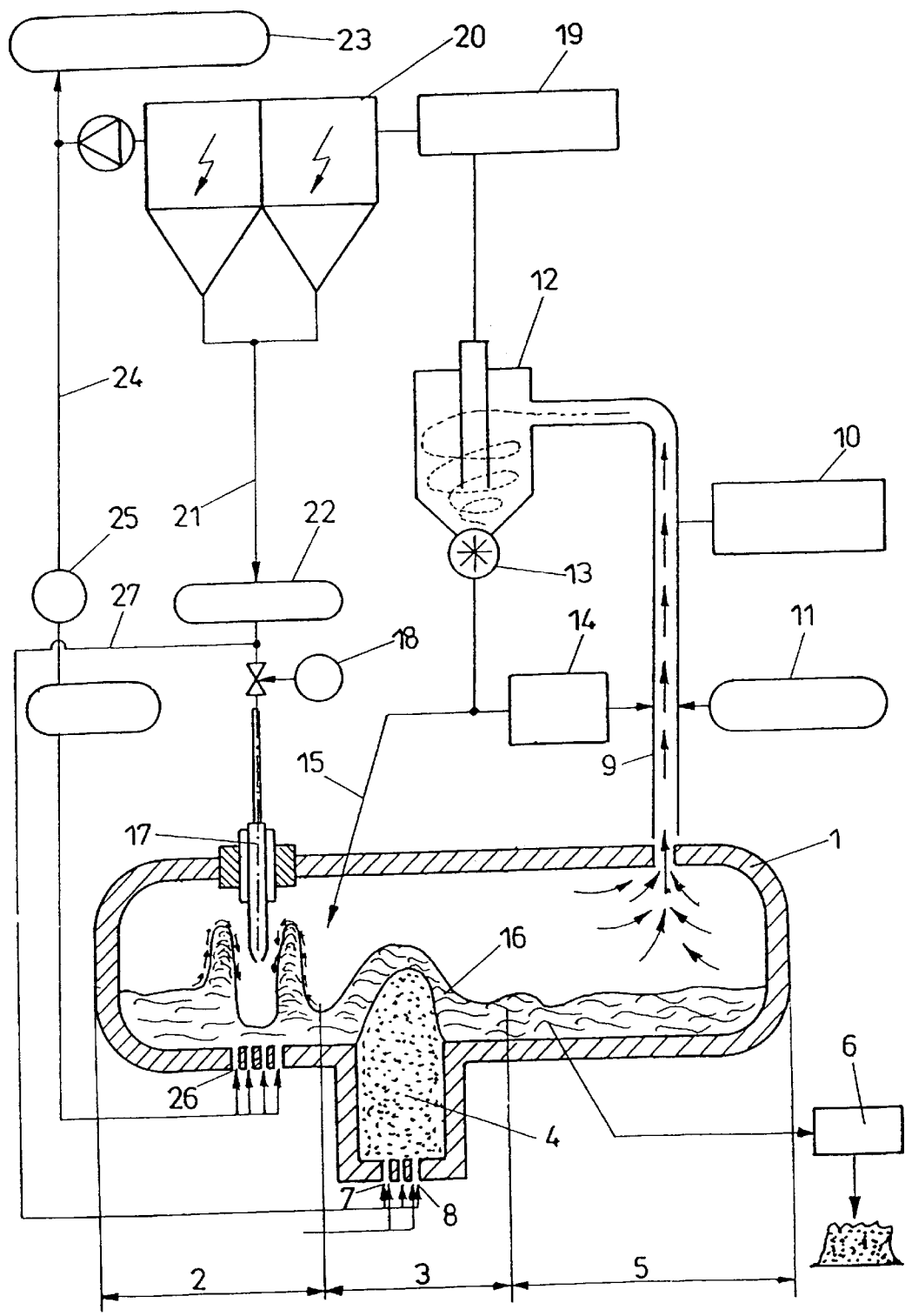

PROCESS FOR RECLAIMING COMBUSTION RESIDUES

BACKGROUND OF THE INVENTION

1. Field of the Invention

The invention relates to a process for working up combustion residues and slags from waste incineration plants or steel works slags in a converter, wherein the molten slag is reacted with a metal bath while blowing oxygen through the metal bath.

2. Prior Art

Working-up processes in which slags are reacted with a metal bath, thereby enabling the successful reduction of metallic portions from the slags, have already been suggested. In the processes suggested so far, the reduction potential of the metal bath was controlled by suitable measures, to which end the blowing in of carbon while simultaneously blowing in oxygen through submerged tuyeres has been proposed in the first place.

Yet, a relatively high dust emission rate and hence relatively high iron losses have been observed in pertinent tests. When operating the proposed processes in a conventional manner, converter emissions were found to constitute 10 to 15% of the total converter contents, thus involving considerable expenditures in the subsequent purification of offgases.

SUMMARY OF THE INVENTION

The invention aims at further developing a process of the initially defined kind with a view to increasing the recovery of iron and substantially reducing the dust emission rate and hence the loss of iron. To solve this object, the process according to the invention essentially consists in that the slag is introduced at a slag layer height of above 1.2 m and the oxygen is introduced into the bath for cooling the submerged tuyeres in the form of air or along with $CO_2$ or water vapor. The process control according to the invention is based on the consideration that, due to extremely high temperatures prevailing in the iron bath, iron particles evaporate around the submerged tuyere mushrooms at temperatures of up to 2400° C. At such high temperatures, iron has already a quite considerable vapor pressure, the superheated iron vapor passing through the iron and slag bath layers and partially condensing to colloidal iron droplets in the micrometer range within the converter gas space. Such iron droplets in the micrometer range are readily discharged from the converter, wherein offgas measurements revealed that the fine dust particles in the offgases contained relatively high portions of metallic iron. Additional iron droplets and slag particles are thrown out of the converter through the submerged tuyere system.

By cooling the tuyeres through the use of air and, in particular, through the simultaneous blowing-in of $CO_2$ and water vapor for cooling the tuyeres, it is feasible to lower the temperature level around the submerged tuyeres to justifiable values at which the iron vapor pressure gets already negligible. As a result, it will do to adjust the tuyere pressure such that no iron droplets can penetrate the slag melt. Due to the favorable heat transfer between slag and iron bath, a respective minimum height of the slag layer thickness has, however, been observed for this purpose, wherein, in addition to an iron bath height of approximately 1 m, a minimum height of the slag layer of more than 1.2 m has been shown to suffice in order to drastically minimize iron emissions and hence iron losses.

Advantageously, the process according to the invention is carried out in a manner that hydrocarbons are additionally introduced through the submerged tuyeres for cooling the tuyeres. Bearing in mind the blowing pressures that are partially higher as compared to conventional bottom-blowing converters, the admixture of $CO_2$ or water vapor for cooling and rendering inert is of particular importance in any event. Advantageously, the process is controlled in a manner that $CO_2$ and $H_2O$ vapor as well as optionally $CH_4$ are injected in amounts capable of adjusting a bath temperature of less than 1700° C. in the vicinity of the tuyeres, the bath temperature in the vicinity of the tuyeres advantageously being maintained between 1450° C. and 1650° C. At such temperatures, no remarkable amounts of evaporated iron will form so that an essential factor that appears to be responsible for high converter emissions is, thus, taken into account.

In order to ensure the desired heat transfer and a reaction as complete as possible, it is advantageously proceeded in a manner that the slag layer height is adjusted to about 1.8 m.

As already mentioned in the beginning, it is necessary to adjust the reduction potential of the metal bath accordingly in order to selectively reduce metallic portions from the slag. Advantageously, this is effected in that carbon is injected into the metal bath by aid of inert gases such as $N_2$ to adjust the reduction potential of the metal bath.

A portion of dust not to be neglected is still ejected together with the offgases, wherein, according to the invention, the purification of the offgases without additional by-products not to be further used in the process advantageously is feasible in a simple manner in that solids carried off along with the offgases are cooled with additives such as $Al_2O_3$, $SiO_2$ or slag granulates in a floating gas or fluidized bed heat exchanger and the cooled solids are separated in a cyclone separator and returned to the slag bath. With such a floating gas or fluidized bed heat exchanger, additives as are beneficial, for instance, to the adjustment of the basicity and viscosity of the slag may be used simultaneously for cooling, and enhancing the separation of, the solids discharged with the offgases and may again be returned to the slag bath in a simple manner, thus constituting a complete circulatory system.

Further improvement of the energetic utilization and hence the economy of the process may be reached in that the hot gas leaving the cyclone separator is conducted over a filter and, in particular, a bag or sack filter after further cooling under energy utilization and is supplied to residual gas utilization such as, e.g., combustion.

In order to ensure the optimum heat transfer to the slag melt, it is advantageously proceeded, in an afterburning space, in a manner that the residual gas at least partially is conducted through the slag bath via tuyeres and subjected to afterburning for heating the slags. The optimum heat transfer is provided, in particular, by using high-pressure submerged tuyeres, wherein in the afterburning space about 35% by weight is dispersed in the form of slag droplets by aid of the residual gas employed as recycling gas, afterburning of the carbon monoxide formed and of the hydrogen being feasible by up to 60%. The degree of afterburning is defined as the ratio of the sum of carbon monoxide and hydrogen to carbon monoxide and hydrogen and $CO_2$ and $H_2O$. In doing so, the afterburning heat is transferred to the slag particles by radiation and convection, thereby enabling particularly efficient heating of the slag while utilizing the chemical heat of the converter offgas.

Due to the measures taken according to the invention, it is feasible to drastically reduce the amount of dust discharged towards the off gas purification system. About 5% by weight of the iron bath content leaves the converter primarily in the form of slag droplets. Cold additives in the form of $Al_2O_3$, $SiO_2$ as well as slag granulates may be charged into a floating gas heat exchanger or a fluidized bed heat exchanger just as the solids separated from the cyclone separator and having grain sizes ranging from 0.5 to 3.5 mm. The cold additives as well as the cooled cyclone product abruptly cool the converter emissions which are still in the liquid or pasty state to the major extent. The mixed dust obtainable in this manner may be readily separated in a hot cyclone separator at temperatures of about 750° C. and returned to the afterburning space. In the case of slag granulates comprising high portions of iron oxide, the latter is at least partially metallized by co-current cooling in the floating gas heat exchanger or during cooling in a circulating fluidized bed reactor, thereby ensuring particularly efficient cooling.

The addition of additives and recycling of the cooled cyclone product also allow for the conversion of highly chromium-containing steel slags into highly liquid chromium-free synthetic blast furnace slags for the production of cement.

BRIEF DESCRIPTION OF THE DRAWING

In the following, the invention will be explained in more detail by way of an arrangement for carrying out the process according to the invention schematically illustrated in the drawing.

DETAILED DESCRIPTION OF A PREFERRED EMBODIMENT OF THE INVENTION

In the drawing, a converter is denoted by 1, which is designed as an iron bath reactor. The converter is subdivided into three zones, a first zone 2 serving afterburning and hence to enhance the energy balance. In a consecutive zone 3, reduction over an iron bath 4 takes place, whereupon a settling zone 5 is consecutively provided, from which the slag melt may be drawn off and supplied to granulation 6.

The iron bath 4 in the reduction zone is fed with carbon as well as oxygen, air, $CO_2$, water vapor and optionally methane gas via bottom tuyeres 7 and 8, thereby adjusting the reduction potential of the iron bath 4 accordingly. Depending on the starting composition of the slags and, in particular, on the chromium portion of these slags, the iron bath 4 is chromed up, thereby enabling the recovery of ferrochromium carburé.

The hot offgases are discharged from the settling zone 5 of the converter 1 at temperatures of about 1700° C. through a duct 9. The offgases are supplied to a floating gas heat exchanger 10 while charging from a bin 11 additives and, in particular $Al_2O_3$, $SiO_2$ or waste incineration slag granulates already subjected to first processing on that site. The fine particles contained in the offgas are cooled to temperatures of about 750° C. and get into a cyclone separator 12. The solids discharged from the cyclone separator 12 via a cellular wheel sluice 13 may be conducted over a returns cooler 14 and, like the additives from the bin 11, also supplied to the floating gas heat exchanger. The solids subsequently are returned to the afterburning zone through a duct 15 and charged onto the molten steel slag. The steel slag is denoted by 16.

A water-cooled oxygen lance 17 opens into the afterburning space, oxygen being fed from an oxygen source 18.

Hot residual gases leave the cyclone separator 12 and, at first, are conducted through a hot gas cooler 19, after which they are fed to a filter 20. The filter dust can be discharged via a duct 21 and collected in a reservoir 22. From that reservoir 22, the filter dust may be admixed to the oxygen of the oxygen lances and recycled into the afterburning zone of the converter 1. A substantial portion of the residual gas leaving the filter 20 may subsequently be supplied to residual gas utilization 23 with a high calorific value still being available taking into account the high portion of about 50% by volume of CO and $H_2$ contained in the residual gas. A partial amount of this residual gas, via a duct 24 and a compressor 25, reaches submerged tuyeres 26 at a pressure of between 4 and 12 bars, which submerged tuyeres open into the slag bath 16 contained in the afterburning zone 2. Together with the oxygen fed via the oxygen lance 17, further combustion under intensive utilization of the thermal energy for heating the slag bath is feasible.

In case filter dust having a high iron content occurs, such a highly iron-containing filter dust may be supplied to the bottom tuyeres 7 and 8 provided below the iron bath 4 through a duct 27 in order to thereby recover the metallic portion almost completely.

The process according to the invention also renders feasible the successful working up of special steel slags and, in particular, highly vanadium-containing steel slags with a concentrated vanadium alloy being obtained as the metal bath 4. That alloy subsequently may be slagged, forming a highly concentrated carbon-free vanadium slag from which ferro-vanadium free of carbon to the major extent can be recovered.

What is claimed is:

1. A process for treating metallic residues from waste incineration plants and steel works in a converter having tuyeres, said process comprising:

providing molten slag in the converter at a layer height of more than 1.2 m, the molten slag containing the metallic residues;

reacting the molten slag with a metal bath contained in the converter while introducing an oxygen stream through the tuyeres submerged in the metal bath in an amount and at a temperature sufficient to cool the submerged tuyeres and adjust the metal bath to less than 1700° C. in temperature in the vicinity of the tuyeres, said reacting of the molten slag with the metal bath causing the metallic residues of the molten slag to be reduced and passed into the metal bath; and injecting an inert gas containing carbon into the metal bath to adjust the reduction potential of the metal bath, wherein the oxygen stream comprises oxygen, at least one member selected from the group consisting of $CO_2$ and water vapor, and optionally hydrocarbons.

2. The process of claim 1, wherein the oxygen is in the form of air.

3. The process of claim 1, wherein the oxygen stream comprises hydrocarbons.

4. The process of claim 1, wherein the metal bath is between 1450° C. and 1650° C. in temperature in the vicinity of the tuyeres.

5. The process of claim 1, wherein the layer height of the molten slag is about 1.8 m.

6. The process of claim 1, wherein the inert gas is nitrogen.

7. The process of claim 1, further comprising:

discharging offgases from the converter and carrying off solids with the offgases;

cooling the offgases and solids discharged from the converter in a heat exchanger with at least one additive selected from the group consisting of $Al_2O_3$, $SiO_2$, and slag granulates; and separating the solids from the offgases in a cyclone separator and returning the separated solids to the molten slag contained in the converter.

8. The process of claim 7, wherein the heat exchanger is a floating gas heat exchanger or a fluidized bed heat exchanger.

9. The process of claim 7, further comprising discharging hot gases from the cyclone separator, cooling and filtering the discharged hot gases, then supplying the discharged hot gases to a residual gas utilization device.

10. The process of claim 9, further comprising returning at least a portion of the discharged hot gases to the molten slag in the converter via additional tuyeres and subjecting the returned hot gases to afterburning for heating the molten slag.

* * * * *